(12) United States Patent
Yoshida et al.

(10) Patent No.: US 6,575,420 B2
(45) Date of Patent: Jun. 10, 2003

(54) ROTATING AND ADJUSTING MECHANISM OF SEAT FOR VEHICLE

(75) Inventors: Tomonori Yoshida, Kanagawa-ken (JP); Moriyuki Eguchi, Kanagawa-ken (JP)

(73) Assignee: Johnson Controls Automotive Systems Corporation, Kanagawa-ken (JP)

( * ) Notice: Subject to any disclaimer, the term of this patent is extended or adjusted under 35 U.S.C. 154(b) by 0 days.

(21) Appl. No.: 09/943,162

(22) Filed: Aug. 30, 2001

(65) Prior Publication Data

US 2002/0023995 A1 Feb. 28, 2002

(30) Foreign Application Priority Data

| Aug. 31, 2000 | (JP) | 2000-263619 |
| Aug. 31, 2000 | (JP) | 2000-263621 |
| Aug. 31, 2000 | (JP) | 2000-263622 |

(51) Int. Cl.⁷ ............ F16M 13/00; B60N 2/14; A47C 3/18
(52) U.S. Cl. ............ 248/425; 248/349.1; 297/344.22; 297/344.26
(58) Field of Search ............ 248/425, 429, 248/430, 349.1; 297/344.21, 344.22, 344.26; 108/94, 139, 142, 143

(56) References Cited

U.S. PATENT DOCUMENTS

| 4,971,392 A | * | 11/1990 | Young | 297/256.12 |
| 5,292,179 A | * | 3/1994 | Forget | 248/425 |
| 5,482,354 A | * | 1/1996 | Gryp | 297/344.22 |
| 5,810,441 A | * | 9/1998 | Ezuka et al. | 297/344.22 |
| 5,904,399 A | * | 5/1999 | Kim et al. | 248/425 |
| 5,941,498 A | * | 8/1999 | Hoshihara et al. | 248/425 |
| 6,021,989 A | * | 2/2000 | Morita et al. | 248/349.1 |

FOREIGN PATENT DOCUMENTS

| DE | 28 28 503 A1 | 1/1980 |
| EP | 0 123 897 A2 | 11/1984 |
| EP | 0 515 275 A1 | 11/1992 |
| EP | 0 812 722 A2 | 12/1997 |
| JP | 08011600 | 1/1996 |
| JP | 8011600 | 1/1996 |
| JP | 410217811 A | * | 8/1998 |
| JP | 11129794 | 5/1999 |
| JP | 11222059 A | * | 8/1999 |
| JP | 02000006695 A | * | 1/2000 |
| JP | 2002052961 A | * | 2/2002 |

* cited by examiner

*Primary Examiner*—Anita King
(74) *Attorney, Agent, or Firm*—Foley & Lardner

(57) ABSTRACT

An engaging and sliding portion (21) having a substantially inverted-U cross sectional shape is formed in a lower base (11). An upper base (13) is arranged via an engaging and sliding portion (21) of the lower base (11) and a first rolling member (23). A sliding portion (25) having a substantially U cross sectional shape and engaging with the engaging and sliding portion (21) is formed in a holding member (15). A second rolling member (27) is provided between the sliding portion (25) of the holder (15) and the engaging and sliding portion (21) of the lower base (11). A recess (13a) is formed at a position of an adhered portion of the holder (15) in the upper base (13). A position of an adhered portion in a seat main body is formed in a substantially linear shape. A mounting portion (15a) having a substantially inverted-U cross sectional shape is formed in the holder (15). A rotating lever (45) having a lock hook (45a) inserted to a lock hole (62) of the lower base (11) is pivoted to the upper base (13). Lever guides (43, 57) for guiding.

9 Claims, 8 Drawing Sheets

ROTATING AND ADJUSTING MECHANISM OF SEAT FOR VEHICLE

CROSS-REFERENCE TO RELATED PATENT APPLICATIONS

This application claims benefit of priority under 35 USC 119 based on Japanese Patent Applications P2000-263619 filed Aug. 31, 2000, P2000-263621 filed Aug. 31, 2000 and P2000-263622 filed Aug. 31, 2000, the entire contents of which are incorporated by reference herein.

BACKGROUND OF THE INVENTION

1. Field of the Invention

The present invention relates to a rotating and adjusting mechanism of a seat for a vehicle which supports a seat main body on a floor surface of a passenger's room so as to freely rotate and adjust, and more particularly to an improvement of a rotating and adjusting mechanism of a seat for a vehicle which is provided with an annular lower base fixed to a floor surface side of a passenger's room, an annular upper base to which a seat main body is adhered, and a holder adhered to an outer peripheral edge of the upper base and holding the lower base.

2. Description of the Related Art

In conventional, there has been known a rotary type vehicle seat employing a structure which can change and adjust an orientation of the seat in response to a passenger's choice and desire.

That is, as this kind of rotary type vehicle seat, there has conventionally been proposed a mechanism in which a rotating and adjusting mechanism in accordance with a surface meeting system, a shaft-up rotary type or the like is provided below the seat main body by being interposed between the seat main body and the floor surface of the passenger's room.

In Japanese Patent Application Laid-Open No. 8-11600, the structure is provided with an annular lower rail fixed to a floor side of the vehicle, an upper rail having a substantially U-shaped sliding portion slidably engaging with an annular sliding portion having a substantially inverted-U cross sectional shape of the lower rail, and a bracket for fixing the upper rail to a seat cushion frame. There is shown a seat rotating apparatus in which a ball is interposed between the annular sliding portion of the lower rail and the bracket, and an outer wall surface of the annular sliding surface with which the ball is in contact is formed in a taper surface moving to an inner downward direction, thereby achieving an automatic aligning function.

Further, in Japanese Patent Application Laid-Open No. 11-129794, there has been shown a structure having a lower plate provided in a floor side, an upper plate provided in a side of a seat and supported to the lower plate via a ball so as to rotate on its axis on a horizontal surface, and a set plate connected to the lower plate by a caulking pin and gripping the upper plate together with the lower plate via the ball. Further, the structure is made so as to adjust and change an opposing interval between the set plate and the lower plate by collapsing a boss portion of the set plate, so that it makes a rotating torque of the upper plate proper.

As shown in FIG. 1, a lock mechanism 101 is provided in a rotating and adjusting mechanism 100 of a seat. The lock mechanism 101 is structured such that a lock hole 121 is provided in a lower base 11 and a lock hook 125 of a rotary lever 123 pivoted to a side of an upper base is inserted to and engaged with the lock hole 121, whereby the rotating and adjusting mechanism 100 of the seat can be made in a lock state.

However, in the seat rotating apparatus shown in Japanese Patent Application Laid-Open No. 8-11600, the lower rail is opposed to the upper rail having the substantially U-shaped sliding portion slidably engaged with the substantially U-shaped annular sliding portion of the lower rail via a shoe. Accordingly, a sliding resistance is increased and a sufficient aligning function cannot be obtained, so that there is a risk that a dispersion is generated. Further, there are disadvantages that the bracket and the upper rail are easy to be deformed when an impact load from the seat side is applied to the bracket and the upper rail, a weight is increased since it is impossible to reduce a thickness, and it is impossible to perform a simple and rapid rotating operation due to an increase of the sliding resistance. In the case that the ball between the bracket and the lower rail is positioned above the taper surface, the bracket is positioned at a high position in a vertical direction. The position of the bolt by which the bracket is adhered to the upper rail becomes high, so that there is a disadvantage that the height of the seat mounting surface becomes high.

In the rotating apparatus shown in Japanese Patent Application Laid-Open No. 11-129794, it is possible to reduce a height in a vertical direction of a lower plate, however, the lower plate becomes longer in a horizontal direction, so that it is impossible to make the structure of the rotating apparatus compact. Accordingly, there are disadvantages that the weight of the rotating apparatus is increased and the sliding resistance is increased.

SUMMARY OF THE INVENTION

An object of the present invention is to provide a rotating and adjusting mechanism of a seat for a vehicle satisfied with below effects:

(1) The rotating and adjusting mechanism of a seat for a vehicle comprising a lower base, an upper base and a holder can be simply structured by a minimum number of parts.

(2) An automatic aligning function can be provided in the rotating and adjusting mechanism of a seat for a vehicle.

(3) An impact load can be securely transmitted from the holder to the lower member.

(4) A thickness of the seat can be reduced due to a less deformation of the seat.

(5) A sliding resistance can be reduced by lessening a weight of the seat.

(6) The rotational adjustment of the seat can be easily and rapidly performed by reducing a rotational operating force.

(7) The seat can be made compact by reducing a height thereof.

(8) Adhering members such as a bolt and the like do not protrude upward at a mounting position of the upper base and the holder.

(9) A seat mounting surface can be made flat.

(10) Rigidity of the seat in a vertical direction can be improved.

(11) The play of the seat is not generated.

(12) The cost of the seat becomes inexpensive.

The first aspect of the invention provides a rotating and adjusting mechanism of a seat for a vehicle, comprising: an annular lower base fixed to a floor surface side of a passenger's room; an annular upper base to which a seat main body is adhered; and a holder adhered to an outer peripheral edge of the upper base, and gripping the lower base, wherein an engaging and sliding portion having a substantially inverted-U cross sectional shape is formed in the annular lower base, the upper base is arranged via the engaging and sliding portion of the lower base and a first rolling member, a sliding portion having a substantially U cross sectional shape, which is engaged with the substantially inverted-U shaped engaging and sliding portion in the lower base, is formed in the holder, a second rolling member is provided between the sliding portion of the holder and the engaging and sliding portion of the lower base, and the first rolling member and the second rolling member are arranged so that a line connecting a center of the first rolling member and a center of the second rolling member is inclined.

The second aspect of the invention provides a rotating and adjusting mechanism of a seat for a vehicle according to the first aspect of the invention, wherein a recess receiving a lower end of the first rolling member and a convex portion receiving the second rolling member, are formed in an upper end of the substantially U cross sectional shaped engaging and sliding portion of the lower base, and wherein a substantially S-shaped receiving portion is formed by the recess and the convex portion.

The third aspect of the invention provides a rotating and adjusting mechanism of a seat for a vehicle according to the first aspect of the invention, wherein a linear portion is formed in a receiving portion receiving an upper end of the first rolling member of the upper base.

The fourth aspect of the invention provides a rotating and adjusting mechanism of a seat for a vehicle according to the first aspect of the invention, wherein a recess is formed at a position of an adhered portion of the holder in the upper base, and an adhered portion of the seat main body in the upper base, is formed in substantially linear shape.

The fifth aspect of the invention provides a rotating and adjusting mechanism of a seat for a vehicle according to the first aspect of the invention, wherein a mounting portion having a substantially inverted-U cross sectional shape is formed in the holder.

The sixth aspect of the invention provides a rotating and adjusting mechanism of a seat for a vehicle according to the fifth aspect of the invention, wherein the substantially inverted-U cross sectional shaped mounting portion is formed in the holder so as to be continuously connected to the substantially U cross sectional shaped sliding portion.

The seventh aspect of the invention provides a rotating and adjusting mechanism of a seat for a vehicle according to the first aspect of the invention, wherein a plurality of lock holes are pierced in the engaging and sliding portion of the lower base, a rotating lever having lock hooks inserted to the lock holes in the lower base is pivoted to the upper base, and a lever guide for guiding the lock hooks in the rotating lever is formed in the upper base.

The eighth aspect of the invention provides a rotating and adjusting mechanism of a seat for a vehicle according to the seventh aspect of the invention, wherein the lever guide for guiding a lower surface side of the lock hooks in the rotating lever is provided in the holder in a side opposing to the lever guide of the upper base.

The ninth aspect of the invention provides a rotating and adjusting mechanism of a seat for a vehicle according to the seventh aspect of the invention, wherein a pivotal point of the rotating lever with respect to the upper base, is formed in a connecting direction of the lock holes in the lower base corresponding to a direction perpendicular to an inserting direction of the lock hook.

DETAILED DESCRIPTION OF THE PREFERRED EMBODIMENTS

Figure 1:
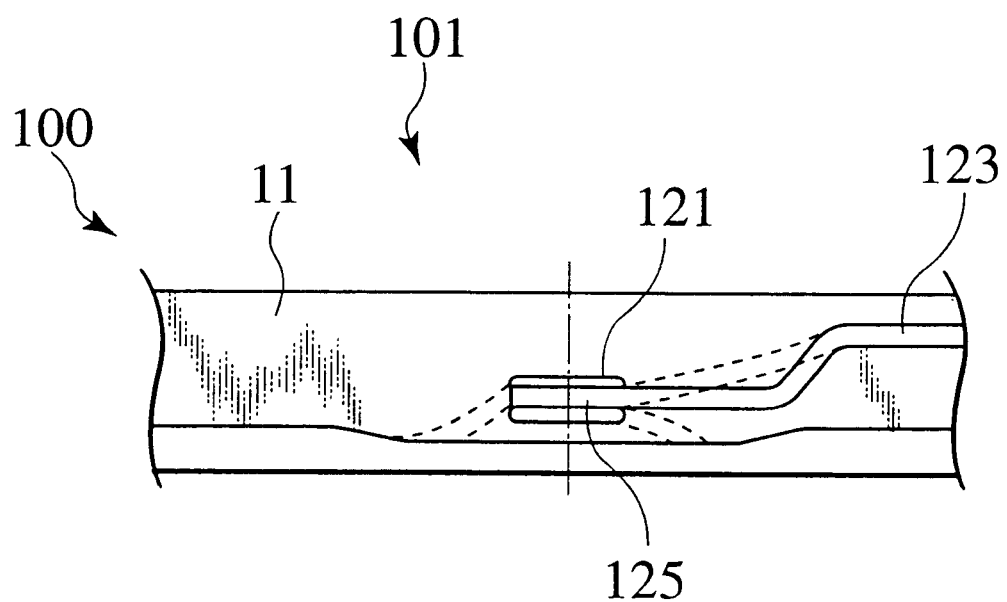
FIG. 1 is a partially front elevational view showing a lock mechanism of a rotating and adjusting mechanism of a seat in accordance with a conventional art.

A description will be in detail given below a rotating and adjusting mechanism of a seat for a vehicle in accordance with the present invention with reference to the accompanying drawings.

A rotating and adjusting mechanism 10 rotating and adjusting a whole of the seat around a substantially center of the seat so as to freely adjust an orientation of the seat is provided below a seat cushion of the vehicle seat between the seat cushion and a floor surface of a passenger's room. The rotating and adjusting mechanism 10 is provided with an annular lower base 11 having a circular opening 12, an annular upper base 13 to which the seat main body is adhered, rotatably supported to the lower base 11 and having a circular opening 14, a holder 15 adhered to the upper base 13 and gripping the lower base 11, and a lock mechanism mentioned below, as is apparent from FIGS. 2 to 8.

Figure 6:
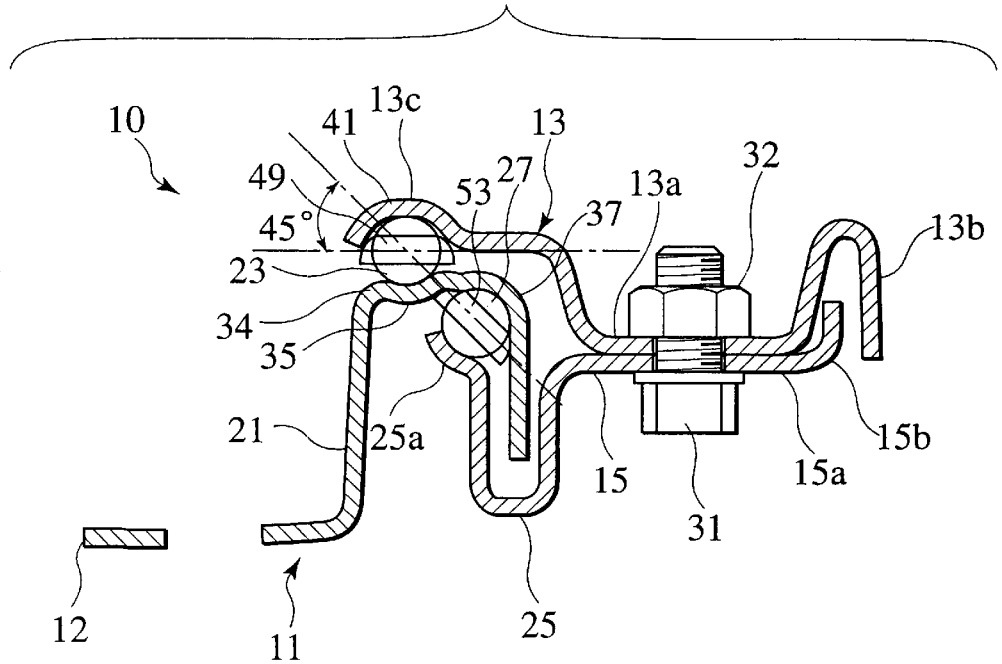
FIG. 6 is a cross sectional view along a line VI—VI in FIG. 3.

As shown in FIG. 6, the annular lower base 11 is formed in a state that an engaging and sliding portion 21 having a substantially inverted-U cross sectional shape protrudes upward in an outer peripheral edge of the annular lower base 11. The annular upper base 13 is arranged via the engaging and sliding portion 21 of the lower base 11 and a first rolling member 23. A sliding portion 25 having a substantially U cross sectional shape and engaging with the engaging and sliding portion 21 having the substantially inverted-U cross sectional shape of the lower base 11 is formed in an inner peripheral edge of the holder 15 in a state of protruding downward.

A recess 13a is formed at a position of the annular upper base 13 at which the holder is adhered. A flange 13b is formed in a side of an outer peripheral edge of the upper base 13, and a ball receiving portion 13c holding the first rolling member 23 from the above is formed in a side of an inner peripheral edge. The recess 13a has a depth by which an adhering member such as a bolt and nut, a rivet or the like, a bolt 31 and a nut 32 in the present embodiment do not protrude upward from the upper base 13. Further, a second rolling member 27 is provided between the sliding portion 25 of the holder 15 and the engaging and sliding portion 21 of the lower base 11.

Figure 3:
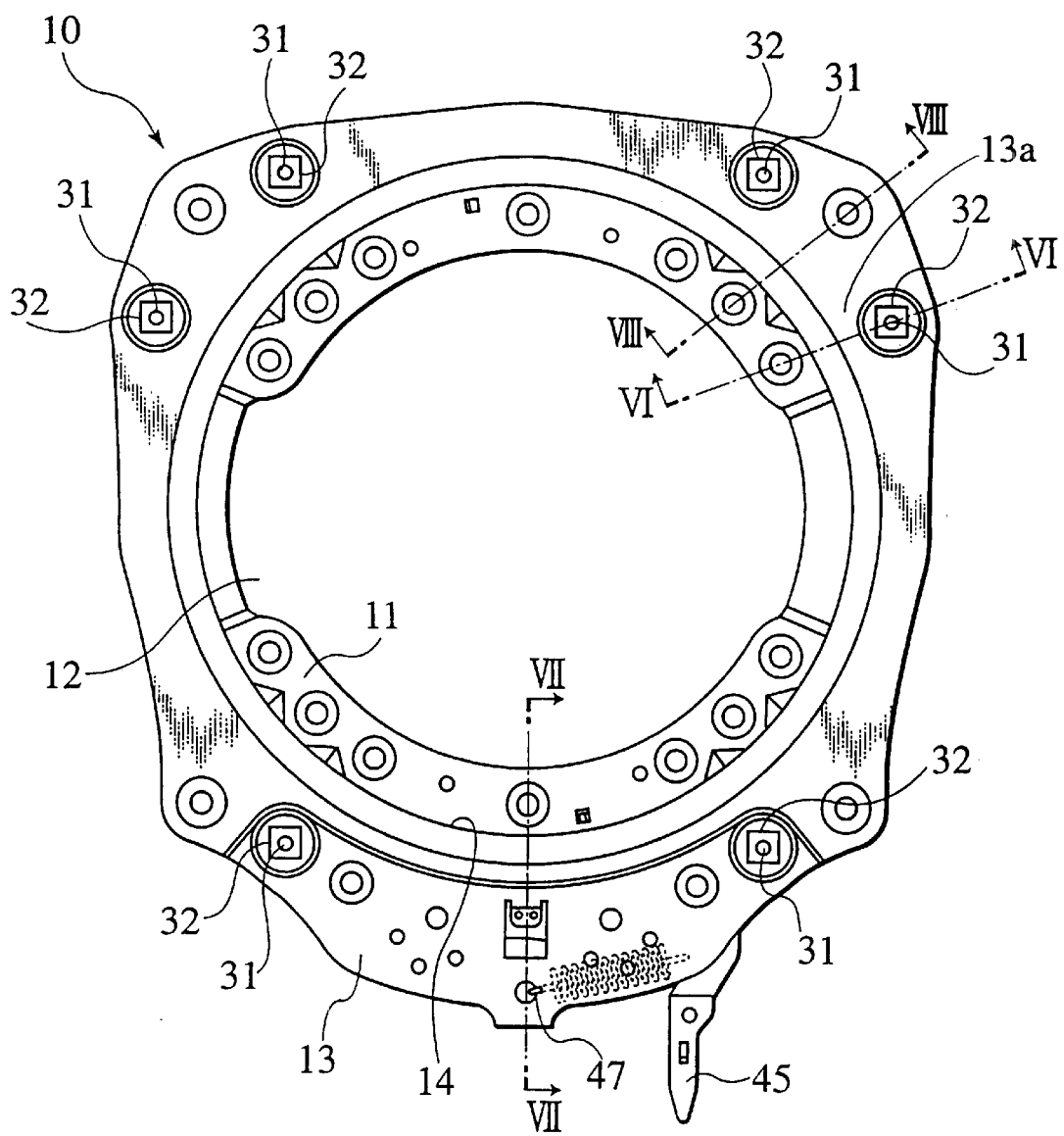
FIG. 3 is a plan view showing the rotating and adjusting mechanism of the seat for the vehicle.
Figure 4:
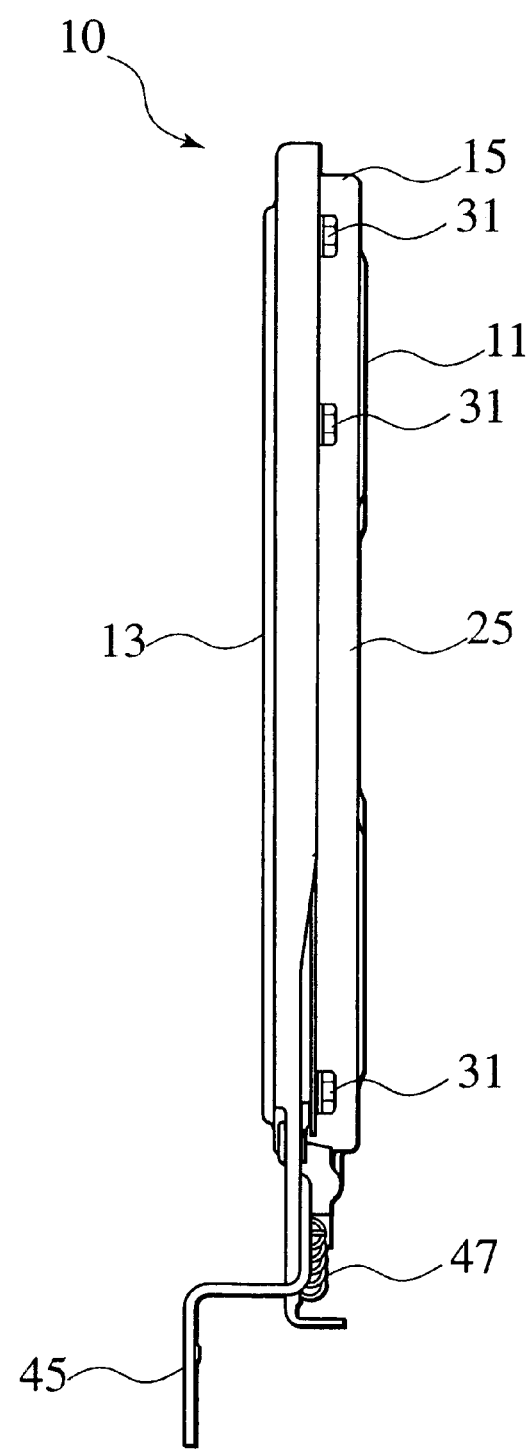
FIG. 4 is a side elevational view showing the rotating and adjusting mechanism of the seat for the vehicle.
Figure 5:
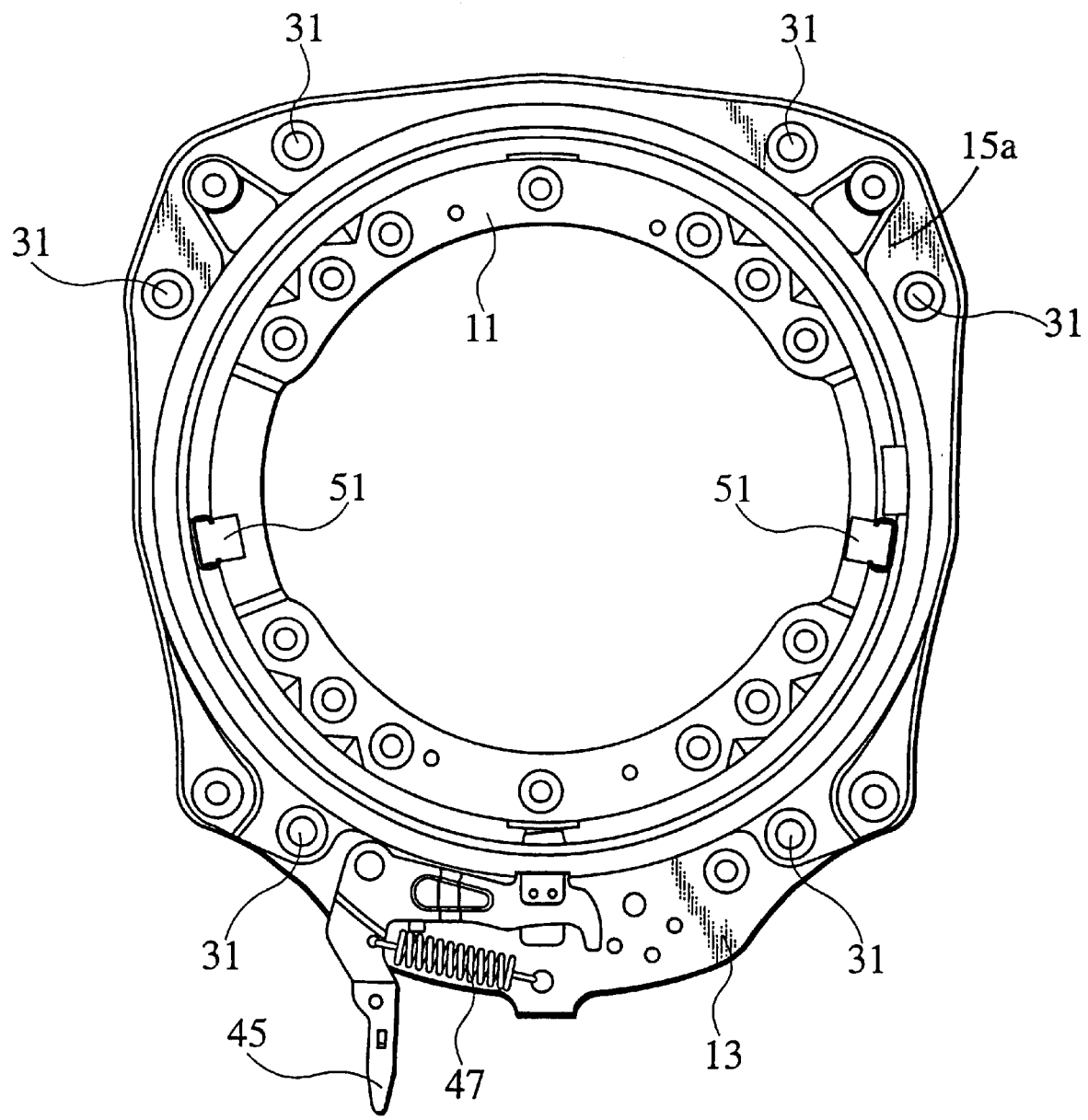
FIG. 5 is a back plan elevational view showing the rotating and adjusting mechanism of the seat for the vehicle.

As shown in FIG. 3 or FIG. 5, the recess 13a in a substantially center of the upper base 13 and a mounting portion 15a disposed outside the sliding portion 25 of the holder 15 are adhered by plural sets of bolts and nuts, six sets of bolts 31 and nuts 32 in the present embodiment. Each of the nuts 32 is welded to the upper base 13. By welding the nuts 32 to the upper base 13, it is possible to fasten by the bolts 31 from the above after reversing the upper base 13 at a time of assembling and mounting the lower base 11 and the holder 15 on the upper base 13.

As shown in FIG. 6, a flange 15b directed upward is formed in an outer peripheral edge of the holder 15. The flange 15b is inserted to a portion inside the flange 13b of the upper base 13.

Figure 8:
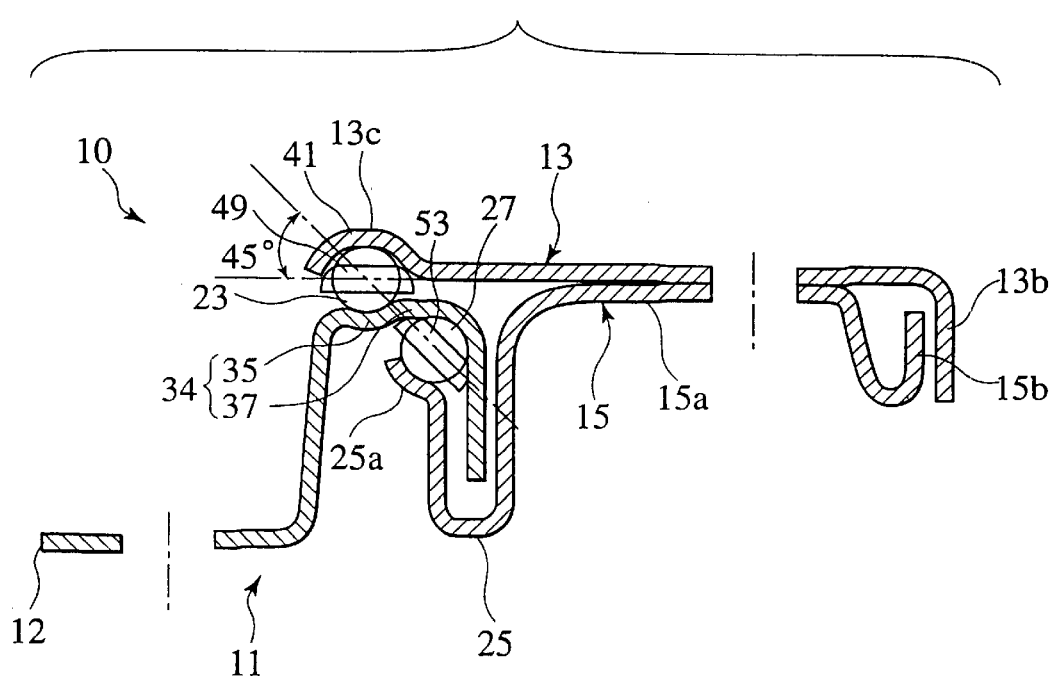
FIG. 8 is a cross sectional view along a line VIII—VIII in FIG. 3.

As shown in FIG. 8, at a position of an adhered portion of the seat main body in the upper base 13, the upper base 13 is formed in a substantially linear shape. Further, in order to form the upper base 13 in the holder 15 opposing to the upper base 13 so as to form a substantially liner shape, a deep drawn mounting portion 15a having a substantially inverted-U cross sectional shape is formed. The substantially inverted-U cross sectional shaped mounting portion 15a is formed in a substantially crank shape with continuously connected to the substantially U-shaped sliding portion.

As shown in FIGS. 6 and 8, a line connecting a center of the first rolling member 23 and a center of the second rolling member 27 is arranged so as to be inclined at about 45 degrees. A recess 35 receiving a lower end of the first rolling member 23 and a convex portion 37 receiving the second rolling member 27 are formed in an upper end of the substantially inverted-U cross sectional shape of the engaging and sliding portion 21 in the lower base 11. A S-shaped receiving portion 34 is formed by the recess 35 and the convex portion 37.

A receiving portion 25a receiving a lower side of the second rolling member 27 is formed in a side of an inner peripheral edge of the sliding portion 25 in the holding member 15. A linear portion 41 is formed in a substantially center of the receiving portion 13c receiving the upper end of the first rolling member 23 in the upper base 13. Due to an existence of the linear portion 41, it is possible to correspond to a dispersion of the parts at a time of assembling, and it is possible to achieve an automatic aligning function.

Figure 7:
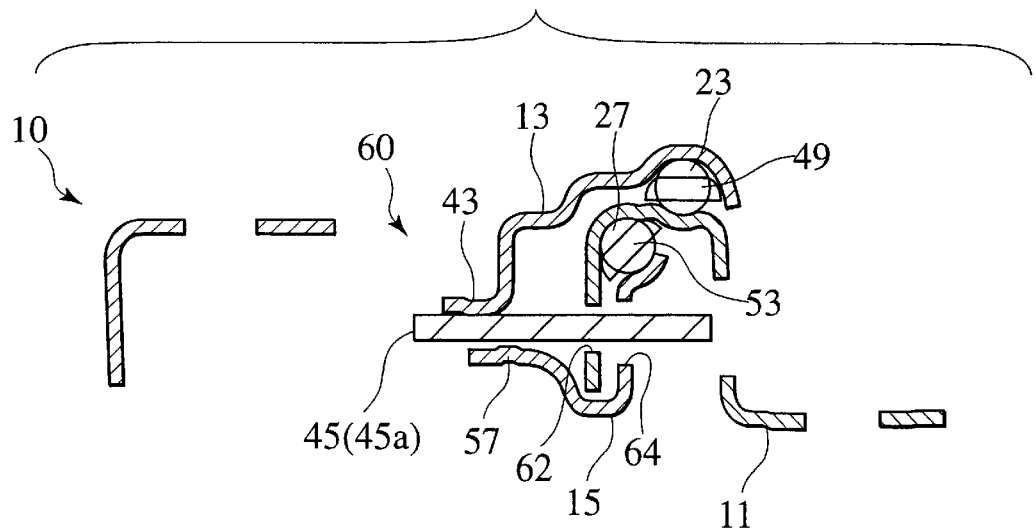
FIG. 7 is a cross sectional view along a line VII—VII in FIG. 3.

As shown in FIG. 7, a lock mechanism 60 of the rotating and adjusting mechanism 10 has a lock hole 62 formed in the lower base 11 and a rotating lever having a lock hook 45a mounted to the upper base 13.

Figure 2:
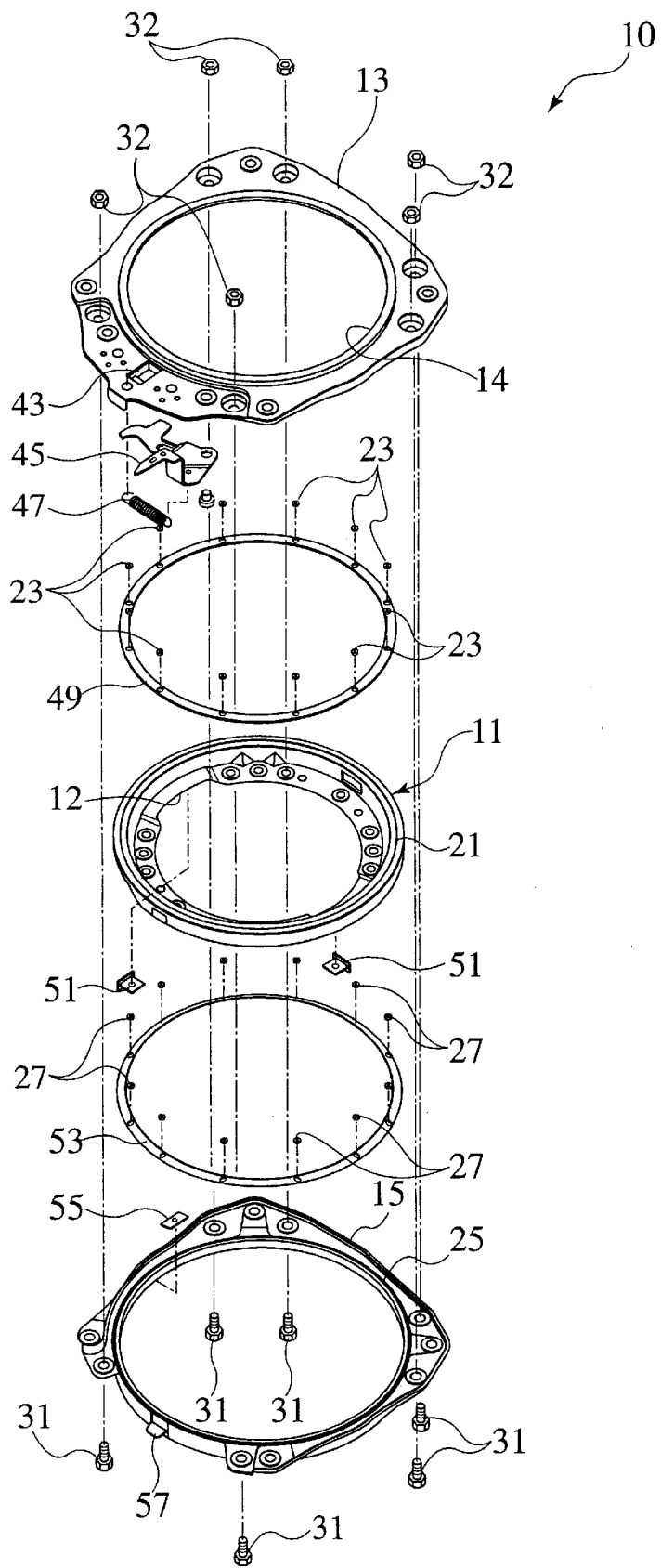
FIG. 2 is an exploded perspective view showing a rotating and adjusting mechanism of a seat for a vehicle.

As shown in FIG. 2, a lever guide portion 43 is formed in a side of the upper base 13, and a lever guide portion 57 is formed in a side of the holder 15. Further, as shown in FIG. 5, a rotating lever 45 and a lever spring 47 are mounted to the upper base 13. In FIG. 2, a plurality of first rolling members 23, twelve first rolling members 23 in the present embodiment, are mounted to a plurality of through holes formed in a ring-shaped upper retainer 49 at a suitable interval.

As shown in FIG. 2, an angle restricting plate 51 of the upper base 13 is adhered to the lower base 11 in accordance with a welding or the like. Further, a plurality of second rolling members 27, twelve second rolling members 27 in the present embodiment, are mounted to a plurality of through holes formed in a ring-shaped lower retainer 53 at a suitable interval. An angle restricting plate 55 of the lower base 11 is adhered to the holder 15 in accordance with a welding or the like.

In FIG. 7, a lower lever guide 57 for guiding a lower surface side of the lock hook 45a in the rotating lever 45 is provided in a side opposing to the lever guide 43 of the upper base 13 in the holder 15. An upper surface side of the lock hook 45a of the rotating lever 45 is guided by the lever guide 43 disposed in an upper portion in the side of the upper base 13. Further, the lower surface side of the lock hook 45a is guided by the lever guide 57 disposed in the lower portion of the holder 15 and inserted to and engaged with the lock hole 62.

Figure 10:
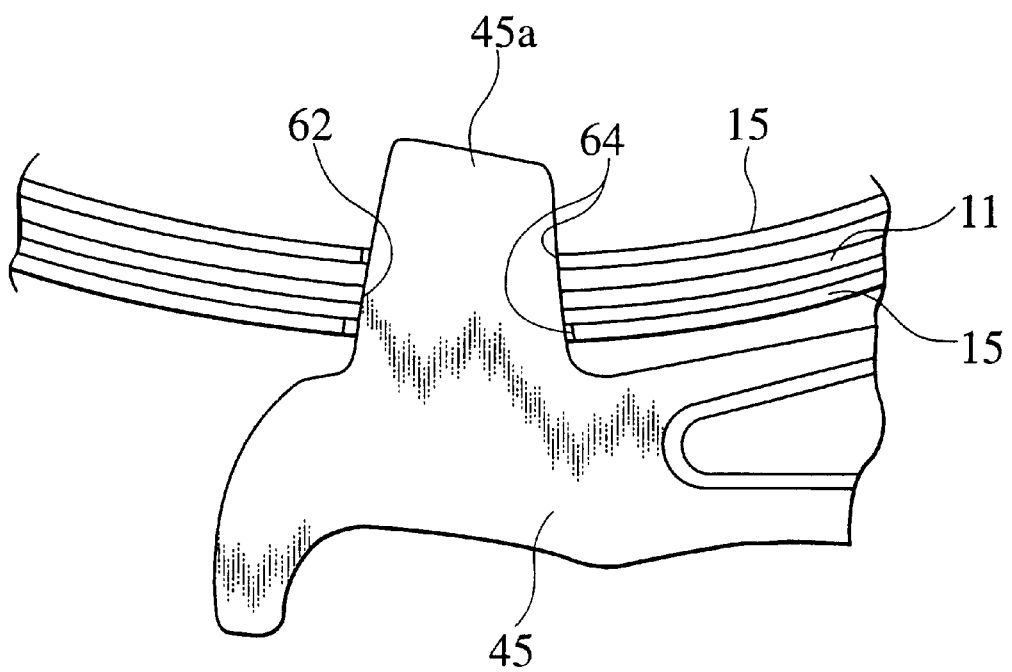
FIG. 10 is a plan view showing an inserting state of a lock hook in the rotating and adjusting mechanism of the seat for the vehicle.

In FIGS. 7 and 10, reference numeral 64 denotes a holder hole formed in the holder 15. Accordingly, even if the lock hole 62 is made small, it is possible for the lock hook 45a to securely, simply and rapidly be inserted and engaged with the lock hole 62. Further, at a time of high load such as an impact application, it is possible to prevent the lock hook 45a from being displaced in a vertical direction so as to hold the lock hook 45a, whereby there is no risk that the lock hole 62 is broken. No load is applied to the lock hook 45a in a direction dropping off from the lock hole, and there is no risk that the lock hook 45a drops off.

Figure 9:
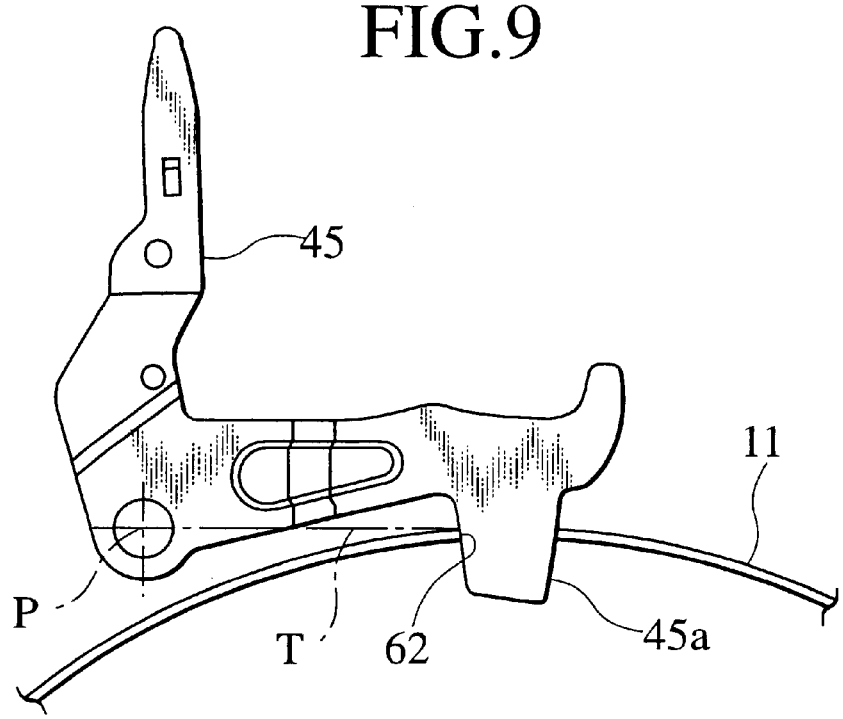
FIG. 9 is a plan view showing a rotating lever in the rotating and adjusting mechanism of the seat for the vehicle.

As shown in FIGS. 9 and 10, a pivot P of the rotating lever 45 mounted to the upper base 13 is formed in a tangential direction T in the lock hole 62 of the lower base 11 corresponding to a direction perpendicular to an inserting direction of the lock hook 45a. That is, an input position of the lock hole 62 for the lock hook 45a is set so as to be perpendicular to the pivot P corresponding to a center of rotation of the rotating lever 45. Accordingly, in the case that an excessive load is applied to the side of the lock hook 45a in the rotating lever 45, it is possible to prevent the lock hook 45a from being deformed in a come-out direction of the lock hook 45a so as to securely hold the lock hook 45a in a lock state.

In accordance with the rotating and adjusting mechanism of the seat for the vehicle of the present invention, the structure may be made such that a sliding mechanism capable of sliding and adjusting the seat in a longitudinal direction is interposed between the lower base 11 constituting the rotating and adjusting mechanism 10 and the floor surface of the passenger's room or between the upper base 13 and the seat main body.

What is claimed is:

1. A rotating and adjusting mechanism of a seat for a vehicle, comprising:
   an annular lower base adapted to be fixed to a floor surface side of a passenger's room, the annular lower base comprising an engaging and sliding portion having a substantially inverted-U cross sectional shape;
   an annular upper base adapted to be adhered to a seat main body;
   a holder adhered to an outer peripheral edge of the upper base and gripping the lower base, the holder comprising a sliding portion having a substantially U cross sectional shape, and the sliding portion engaging the engaging and sliding portion of the lower base;
   a first rolling member disposed between the upper base and the engaging and sliding portion of the lower base; and
   a second rolling member located between the sliding portion of the holder and the engaging and sliding portion of the lower base, a line connecting a center of the first rolling member and a center of the second rolling member being inclined at substantially 45 degrees.

2. A rotating and adjusting mechanism of a seat for a vehicle according to claim 1, wherein the engaging and sliding portion of the lower base comprises a recess portion and a convex portion, the recess portion and the convex portion are formed in an upper end of the engaging and sliding portion, the recess portion receives a lower end of the first rolling member, and a convex portion receives an upper end of the second rolling member, and wherein a substantially S-shaped receiving portion is formed by the recess portion and the convex portion.

3. A rotating and adjusting mechanism of a seat for a vehicle according to claim 1, wherein the upper base comprises a receiving portion receiving an upper end of the first rolling member, and a center part of the receiving portion is a linear portion.

4. A rotating and adjusting mechanism of a seat for a vehicle according to claim 1, wherein the upper base comprises a recess, the recess is formed at a position of the upper base at which the holder is adhered, and wherein the upper base comprises an adhered portion at which the upper base is adapted to be adhered to the seat main body, and the adhered portion is formed in substantially linear shape.

5. A rotating and adjusting mechanism of a seat for a vehicle according to claim 1, wherein the holder comprises a mounting portion, and the mounting portion has a substantially inverted-U cross sectional shape.

6. A rotating and adjusting mechanism of a seat for a vehicle according to claim 5, wherein the mounting portion is formed so as to be continuously connected to the sliding portion.

7. A rotating and adjusting mechanism of a seat for a vehicle according to claim 1, wherein the lower base comprises a plurality of lock holes and a rotating lever having lock hooks and the upper base comprises a lever guide, and wherein the plurality of lock holes are pierced in the engaging and sliding portion, the rotating lever inserted to the plurality of lock holes is pivoted to the upper base, and the lever guide guides the lock hooks.

8. A rotating and adjusting mechanism of a seat for a vehicle according to claim 7, wherein the holder comprises a lever guide, the lever guide guides a lower surface of the lock hooks at a side opposing to the lever guide of the upper base.

9. A rotating and adjusting mechanism of a seat for a vehicle according to claim 7, wherein a pivotal point of the rotating lever mounted to the upper base, is formed in a connecting direction of the lock holes and the connecting direction corresponds to a direction perpendicular to an inserting direction of the lock hook.

* * * * *